(12) United States Patent
Takahashi

(10) Patent No.: US 7,420,547 B2
(45) Date of Patent: Sep. 2, 2008

(54) METHOD AND APPARATUS FOR MATCHING TACTILE SENSATION TO THE CONTENTS OF A DISPLAY

(75) Inventor: Katsunori Takahashi, Yokohama (JP)

(73) Assignee: Alpine Electronics, Inc., Tokyo (JP)

( * ) Notice: Subject to any disclaimer, the term of this patent is extended or adjusted under 35 U.S.C. 154(b) by 651 days.

(21) Appl. No.: 10/823,405

(22) Filed: Apr. 13, 2004

(65) Prior Publication Data

US 2004/0257339 A1    Dec. 23, 2004

(30) Foreign Application Priority Data

Apr. 16, 2003    (JP)  ............................... 2003-111044

(51) Int. Cl.
     *G06F 3/033*      (2006.01)
(52) U.S. Cl. ...................................... 345/184
(58) Field of Classification Search ................. 345/156, 345/161, 173, 184; 74/485
See application file for complete search history.

(56) References Cited

U.S. PATENT DOCUMENTS

| | | | |
|---|---|---|---|
| 6,433,771 B1 | 8/2002 | Yocum et al. | |
| 6,636,197 B1 * | 10/2003 | Goldenberg et al. | 345/156 |
| 6,918,313 B2 * | 7/2005 | Kojima et al. | 74/10.27 |
| 7,046,230 B2 * | 5/2006 | Zadesky et al. | 345/156 |

FOREIGN PATENT DOCUMENTS

| | | |
|---|---|---|
| JP | 08095693 A2 | 9/1994 |
| JP | 10198521 A2 | 12/1997 |
| JP | 11305938 A2 | 4/1998 |
| JP | 2003-099177 | 4/2003 |

* cited by examiner

*Primary Examiner*—Chanh Nguyen
*Assistant Examiner*—Pegeman Karimi
(74) *Attorney, Agent, or Firm*—Brinks Hofer Gilson & Lione

(57) ABSTRACT

A data processing system includes an application unit including a force pattern calculating section and a data processing section. The force pattern calculating section analyzes screen definition data for defining display screen data which is generated by the data processing section, determines a force pattern based upon the disposition of display elements, such as buttons and spaces, in a display screen and based upon force patterns corresponding to the types of the display elements recorded in an object attribute table, and stores the force pattern in a force pattern table. The force pattern is applied to a user based upon an input to the display screen. A commander driver determines a force corresponding to an input from a haptic commander, and controls the haptic commander such that the determined force is applied to the user.

20 Claims, 6 Drawing Sheets

FIG. 3A

| DIRECTION OF ROTATION | ANGLE θ | FORCE F |
|---|---|---|
| CLOCKWISE | ⋮ | ⋮ |
| | — 2ϕ — | |
| | | G3 (θ) |
| | — ϕ — | |
| | | G1 (θ) |
| | — 0 — | |
| | | G2 (θ) |
| | — -ϕ — | |
| | | G4 (θ) |
| | — -2ϕ — | |
| | ⋮ | ⋮ |
| COUNTER-CLOCKWISE | ⋮ | ⋮ |

FIG. 3B

| BUTTON ID | ANGLE RANGE | VALUE |
|---|---|---|
| #1 | θ1 – θ2 | funca() |
| #2 | θn – θm | funcb() |
| ⋮ | ⋮ | ⋮ |

```
image (A, x, y-x, y)
button (type=command style, label, value, x, y-x, y)
button (type=command style, label, value, x, y-x, y)
                        ⋮
button (type=item style, label, value, x, y-x, y)
button (type=item style, label, value, x, y-x, y)
```

METHOD AND APPARATUS FOR MATCHING TACTILE SENSATION TO THE CONTENTS OF A DISPLAY

BACKGROUND OF THE INVENTION

1. Field of the Invention

The present invention relates to a user interface technology using tactile sensation as an interface element.

2. Description of the Related Art

A technology, which is described below, is known as a user interface technology using tactile sensation as an interface element. In the technology, a pointing device, such as a track ball, a mouse, or a joystick, including a mechanism for generating a force opposing an operation of a user or a mechanism for generating vibration is used. The relationship between the position of a cursor, moved by the pointing device, and the position of a display object, such as a menu button, displayed on a display screen is monitored. When a detection is made that the positional relationship between the display object and the cursor is a predetermined relationship, the pointing device applies a predetermined tactile sensation to the user. Such a technology is disclosed in, for example, the following documents which provide related art information related to the invention of the application: Japanese Unexamined Patent Application Publication Nos. 11-305938, 8-95693, and 10-198521.

The related user interface technology, which uses tactile sensation as an interface element, has a problem in that a delayed tactile sensation is applied to the user because the time at which the tactile sensation is applied to the user lags behind the time at which the user performs an operation due to, for example, the time required to determine the positional relationship between the cursor and the display object.

In contrast, if, instead of defining the tactile sensation in terms of the relationship between the position of the display object and the cursor, the tactile sensation which is applied to the user is defined directly by an input (such as input coordinates) from the pointing device in accordance with a layout, such as a menu button layout, on a display screen, the tactile sensation which is applied to the user can be directly defined by the operation of the user. Therefore, it is possible to substantially eliminate the time lag from the time at which the user performs the operation to the time at which the tactile sensation is applied to the user, so that a current tactile sensation can be applied to the user.

However, the technique of directly defining the tactile sensation which is applied to the user at the time of a display screen layout can only be applied to the case in which the layout on the display screen is fixed. Therefore, it cannot be applied to a display screen in which a display screen layout is changed in accordance with a preceding processing result, such as a display screen in which the number of menu buttons on the display screen changes in accordance with a preceding searching result.

SUMMARY OF THE INVENTION

Accordingly, it is an object of the present invention to properly control a tactile sensation applied to a user by an operation of an input device by the user on any display screen.

To this end, according to the present invention, there is provided a data processing system comprising a display device, an input device capable of controlling a tactile sensation applied to a user, and a processing device which operates as a graphical user interface for inputting and outputting data through the input device and the display device. The processing device comprises a display screen generation means, a tactile sensation control pattern setting means, and a tactile sensation controlling means. The display screen generation means generates display screen data which is output to the display device. The tactile sensation control pattern setting means calculates a relationship between input from the input device and the tactile sensation in accordance with a disposition of display elements in a display screen when the output of the display screen data generated by the display screen generation means to the display device starts, and sets the calculated relationship as a tactile sensation control pattern, the tactile sensation being applied to the user based upon the input from the input device, each display element constituting the display screen. The tactile sensation controlling means controls the tactile sensation based upon the input from the input device, in accordance with the tactile sensation control pattern set by the tactile sensation control pattern setting means.

According to such a data processing system, when the display screen in which a layout is not previously determined starts a displaying operation, the relationship between the input and the tactile sensation which is applied to the user by the input operation is calculated in accordance with the disposition of display elements in the display screen. Each display element is illustrated on the display screen. As a result of the calculation, the tactile sensation is set so that it matches the display content on the display screen, after which the tactile sensation is applied to the user based upon the input from the input device in accordance with the setting. Therefore, for any display screen used, it is possible to properly control the tactile sensation which is applied to the user based upon the operation of the input device by the user. In addition, it is possible to directly set a tactile sensation pattern based upon an input value of the input device. In this case, it is possible to substantially eliminate the time lag between the time at which the user performs the operation and the time at which the tactile sensation is applied to the user, so that a current tactile sensation can be applied to the user.

Here, the setting of a tactile sensation control pattern in such a data processing system may be achieved as follows. For example, when the output of the display screen data generated by the display screen generation means to the display device starts, tactile sensation patterns indicating the relationship between the input and the tactile sensation are connected in accordance with the disposition of the display elements in the display screen, and set as the tactile sensation control pattern. The tactile sensation patterns are previously determined in terms of the types of display elements.

More specifically, the setting of a tactile sensation control pattern in such a data processing system may be achieved as follows. For example, the tactile sensation control pattern setting means connects the tactile sensation patterns which are previously determined in terms of the types of display elements in the display screen so that they are tactile sensation patterns which are applied to the user based upon the input from the input device that indicates the positions of the display elements in a display range, and sets the connected tactile sensation patterns as the tactile sensation control pattern.

When an input device comprising an operation unit rotatable by the user, a rotation detecting means for detecting the rotational angle of the operation unit, and an actuator for applying a force corresponding to the direction of rotation of the operation unit to the operation unit is used as the input device, the data processing system may be such that the tactile sensation control pattern setting means sets the tactile sensation control pattern as a pattern indicating the relationship between the rotational angle of the operation unit and the force applied to the operation unit in order for the tactile sensation controlling means to control the actuator in accordance with the tactile sensation control pattern so that the force corresponding to the rotational angle detected by the rotation detecting means is applied to the operation unit.

For example, each display element may be an operation acceptance display object for accepting an operation by the user, a combination of operation acceptance display objects, or a space between the operation acceptance display objects (or a portion where the operation acceptance display objects do not exist on the display screen).

BRIEF DESCRIPTION OF THE DRAWINGS

FIGS. 3A and 3B illustrate a force pattern table and button information used in the data processing system of the embodiment of the present invention, respectively;

DESCRIPTION OF THE PREFERRED EMBODIMENT

Hereunder, a description of an embodiment of the present invention will be given.

Figure 1:
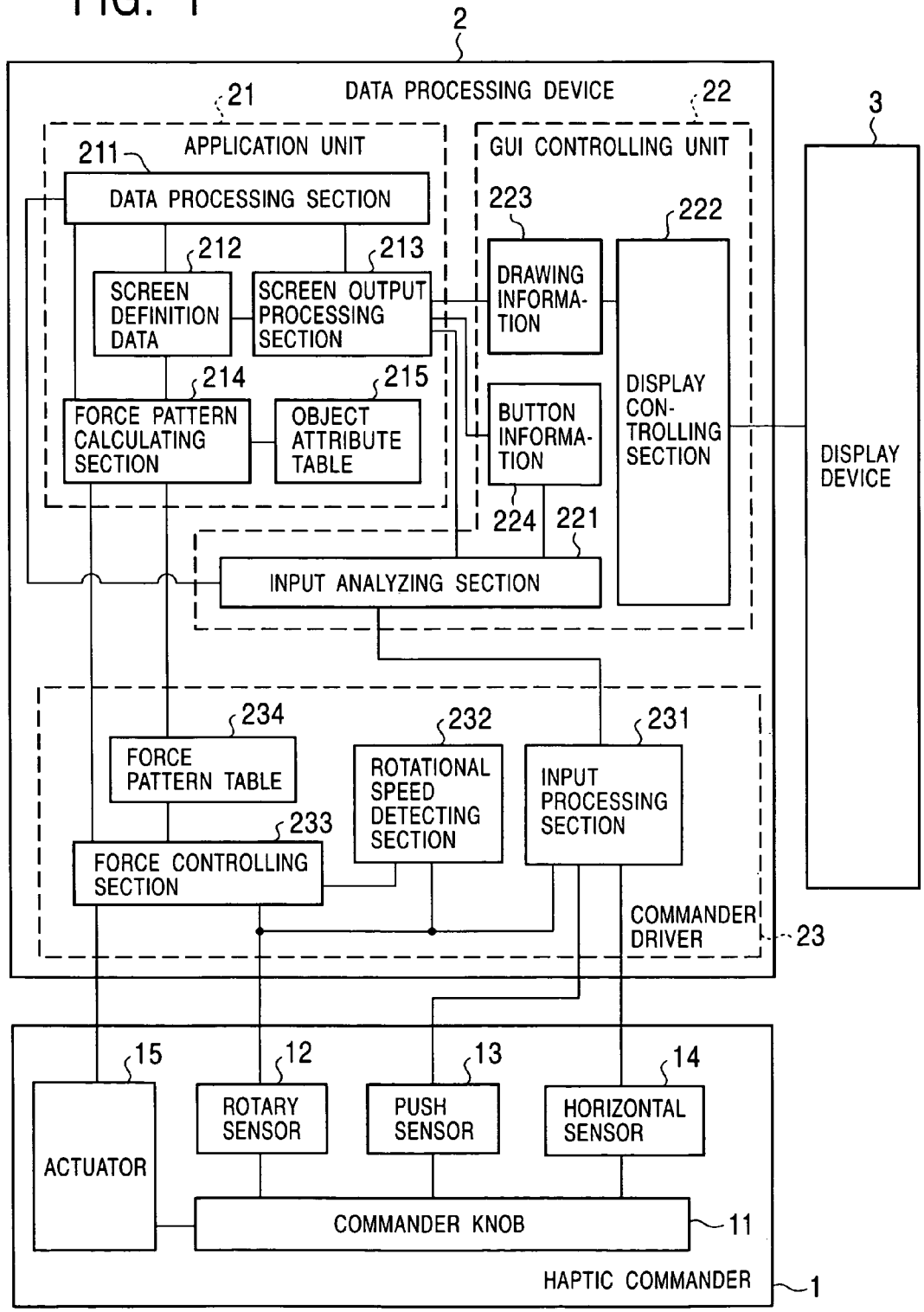
FIG. 1 is a block diagram of the structure of a data processing system of an embodiment of the present invention.

FIG. 1 illustrates the structure of a data processing system of an embodiment of the present invention.

As shown in FIG. 1, the data processing system comprises a haptic commander 1, a data processing device 2, and a display device 3. The haptic commander 1 is an input device which can control tactile sensation which is applied to a user. The data processing device 2 is an electronic calculator.

Figure 2A:
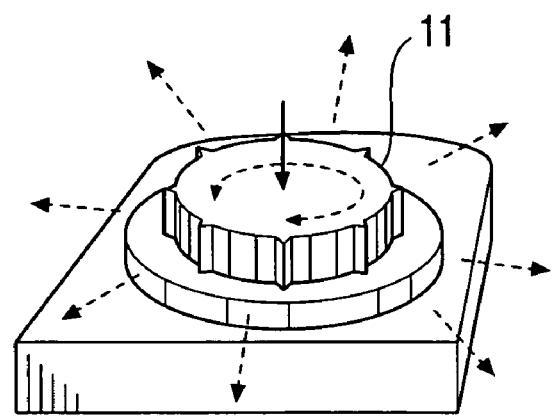
FIGS. 2A and 2B are an external view and a schematic structural view of a haptic commander in the embodiment of the present invention.

As shown in the external view of FIG. 2A, the haptic commander 1 comprises a commander knob 11 which can be operated by rotating it horizontally, by moving or tilting it in 8 horizontal directions (that is, towards the front and back, left and right, upper left and upper right, and lower left and lower right), or by depressing it vertically. As shown in FIG. 1, the haptic commander 1 also comprises a rotary sensor 12 for detecting a horizontal rotational angle of the commander knob 11, a push sensor 13 for detecting whether or not the commander knob 11 has been depressed vertically, a horizontal sensor 14 for detecting whether or not the commander knob 11 has been moved or tilted in any of the 8 horizontal directions, and an actuator 15, such as a DC motor, for applying a horizontal rotational torque to the commander knob 11.

Figure 2B:
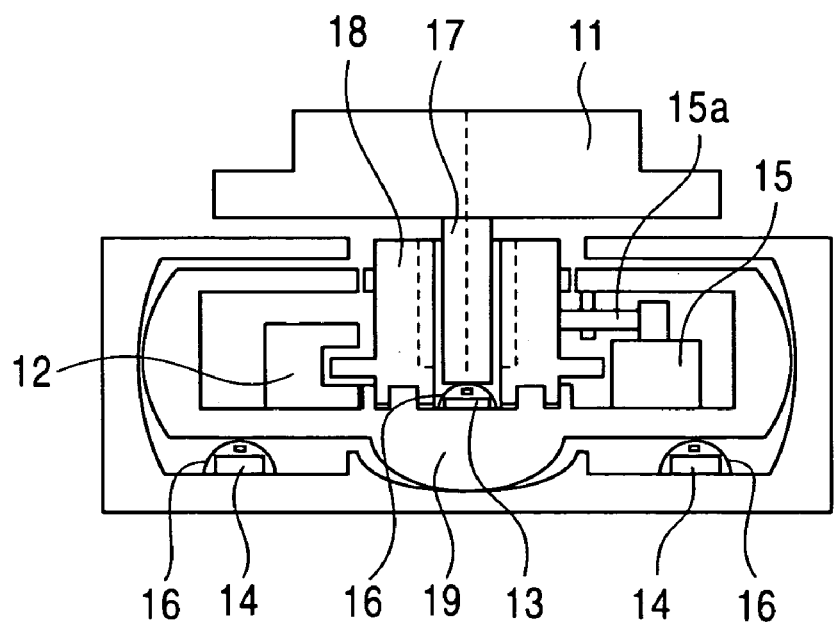

Such a haptic commander 1 may be formed with various structures. For example, as shown in the schematic structural view of FIG. 2B, the haptic commander 1 may comprise a rotor 18, a tiltable member 19, a biasing mechanism, the actuator 15, the rotary sensor 12, the push sensor 13, and the horizontal sensor 14. The rotor 18 holds a commander knob shaft 17 so that the commander knob shaft 17 can slide vertically, and rotates horizontally along with the commander knob shaft 17. The tiltable member 19 holds the rotor 18 so that the rotor 18 can rotate horizontally. The biasing mechanism comprises, for example, a group of plate springs 16. When the user is not applying a force, the biasing mechanism maintains the tiltable member 19 at an upright position, and maintains the commander knob 11 at a neutral position in a vertical direction. The actuator 15 is disposed in the tiltable member 19 and applies a torque to the rotor 18 through a pulley 15a. The push sensor 13 detects any depression of the commander knob shaft 17. The horizontal sensor 14 is disposed so as to detect tilting of the tiltable member 19.

Returning to FIG. 1, in the structure of the haptic commander 1, the rotational angle detected by the rotary sensor 12 is output as rotation data to the data processing device 2, the presence or absence of movement or tilting detected by the horizontal sensor 14 is output as horizontal data to the data processing device 2, and the presence or absence of vertical depression detected by the push sensor 13 is output as push data to the data processing device 2. The actuator 15 applies a torque to the commander knob 11 in accordance with a controlling operation by the data processing device 2.

The data processing device 2 comprises an application unit 21, a graphical interface (GUI) controlling unit 22, and a commander driver 23. The application unit 21 provides a graphical interface (GUI) for the user and processes data in accordance with a user's operation accepted by the GUI. The GUI controlling unit 22 carries out GUI processing, such as inputting and outputting operations between the display device 3 or the haptic commander 1 and the data processing device 2. The commander driver 23 receives data from and outputs data to the haptic commander 1 and controls the torque generated by the actuator 15 of the haptic commander 1. Here, the data processing device 2 may be constructed as a device in which application programs are run on an operating system. In this case, the application unit 21 may be a unit where one of such application programs is run. The GUI controlling unit 22 may provide some of the functions of the operating system for the application unit 21. The commander driver 23 may be incorporated as a device driver in the operating system.

The application unit 21 comprises a data processing section 211, a screen output processing section 213, and a force pattern calculating section 214. The data processing section 211 processes data as necessary, and generates screen definition data 212 for defining a display screen. The screen output processing section 213 generates drawing information 223 and button information 224 based upon the screen definition data 212, and outputs them to the GUI controlling unit 22. The drawing information 223 indicates the content of an image on the display screen, and the button information 224 defines buttons which are objects for accepting a user's operation on the display screen. The force pattern calculating section 214 calculates a force pattern based upon the screen definition data 212 and an object attribute table 215 (described below).

The GUI controlling unit 22 comprises a display controlling section 222 and an input analyzing section 221. The display controlling section 222 is used to perform a displaying operation on the display device 3 in accordance with the drawing information 223 sent from the application unit 21. The input analyzing section 221 analyzes the button information 224 sent from the application unit 21 and information input from the haptic commander 1 through the commander driver 23, and sends a message defining the operation of a button by the user to the data processing section 211.

The commander driver 23 comprises an input processing unit 231, a rotational speed detecting unit 232, and a force controlling section 233. The input processing unit 231 receives rotation data, horizontal data, and push data input thereto from the haptic commander 1 and sends the data to the GUI controlling unit 22. The rotational speed detecting unit 232 determines the direction of rotation and the rotational speed of the commander knob 11 from the rotation data input from the haptic commander 1. The force controlling section 233 controls the actuator 15 in accordance with a force pattern table 234 set by the application unit 21, and the direction of rotation and strength of a torque applied to the commander knob 11.

FIG. 3A shows the content of the force pattern table 234 set by the application unit 21.

As shown in FIG. 3A, in the force pattern table 234, force patterns (torques applied to the commander knob 11) are defined as functions of rotational angles for pairs of directions of rotation and rotational angles of the commander knob 11. However, the forces may be defined as direct numerical values.

The force controlling section 233 calculates the current direction of rotation and the rotational angle of the commander knob 11 from the direction of rotation and the rotational speed of the commander knob 11, and applies a torque defined in terms of the calculated direction of rotation and rotational angle in the force pattern table 234 to the commander knob 11 by controlling the actuator 15. The reference rotational angle (that is, zero degrees) of the commander knob 11 is the rotational angle when the force pattern calculating section 214 instructs the force controlling section 233 to be reset.

FIG. 3B illustrates the button information 224 which is set by the application unit 21.

The button information 224 is information pertaining to the buttons included in the display screen where an image is set as the drawing information 223 by the application unit 21. The button information 224 includes the ID of each button, rotational angle ranges of the commander knob 11, and message values which are sent to the data processing section 211. Each rotational angle range is allocated to an associated button selection. A message value is sent when a determination is made of the operation of the associated button.

When the current rotational angle of the commander knob 11, obtained from the rotational data received from the commander driver 23, changes to that within an angle range corresponding to any of the other buttons defined by the button information 224, the input analyzing section 221 of the GUI controlling unit 22 sends, along with the associated button ID, a message indicating the change in button selection from the previous button to this associated button to the data processing section 211. The reference rotational angle (zero degrees) of the commander knob 11 is the rotational angle when the screen output processing section 213 directs a resetting operation.

When any of the buttons is selected, if the push data received from the commander driver 23 indicates that the push switch is on, the input analyzing section 221 of the GUI controlling unit 22 sends to the data processing section 211 a message containing the value of the selected button defined by the button information 224.

While switching between displays as required, the data processing section 211 of the application unit 21 accepts an operation of the user and carries out a predetermined data processing operation. Displays are switched by generating the screen definition data 212 and instructing the force pattern calculating section 214 and the screen output processing section 213 to be reset. The data processing section 211 accepts the operation of the user by receiving a message from the GUI controlling unit 22. When the force pattern calculating section 214 is instructed to be reset, the force pattern calculating section 214 calculates a new force pattern based upon the screen definition data 212 and the object attribute table 215, updates the definition of the force pattern stored in the force pattern table 234 to that of the new force pattern, and instructs the force controlling section 233 to be reset. On the other hand, when the screen output processing section 213 is directed to be reset, the screen output processing section 213 updates the drawing information 223 based upon the screen definition data 212, and instructs the input analyzing section 221 to be reset.

Hereunder, force patterns which are calculated as described above by the force pattern calculating section 214 will be described.

Figure 4A:
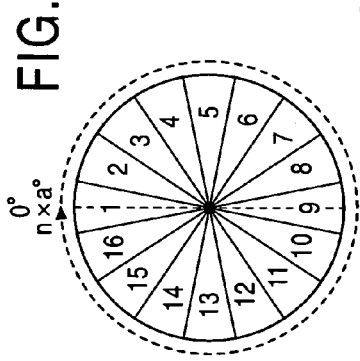
FIGS. 4A to 4F illustrate an example of a display screen and setting of force patterns in the embodiment of the present invention.
Figure 4B:
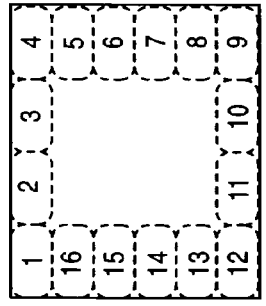
Figure 4C:
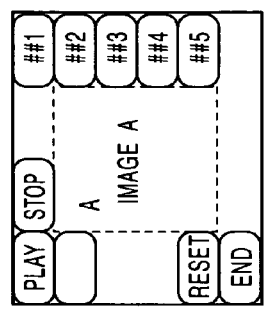
Figure 4D:
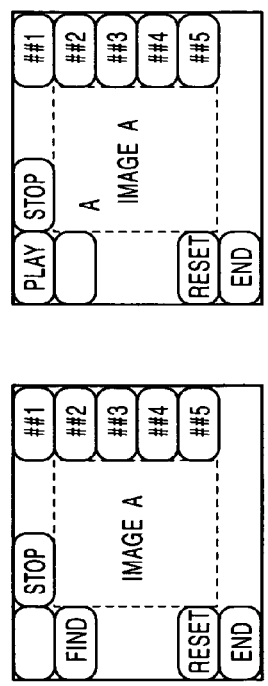

For clarity of the description, a display screen layout used by the application unit 21 will be one in which, for example, as shown in FIG. 4C, buttons are disposed in any number of button areas situated anywhere, among 16 button areas, from the first to the sixteenth button areas 1 to 16 which are displayed on the display screen as shown in FIG. 4A.

In this case, for example, the rotational angle ranges of the commander knob 11 are previously defined, as shown in FIG. 4B, in order to select any button disposed in the corresponding button area. More specifically, in the illustrated example, angle ranges are successively defined clockwise and circularly for the button areas from the first to the sixteenth button areas 1 to 16 at an a/16 degree interval so that the center of the angle range of the button area 1 is zero. The angle range of the commander knob 11 in which modulus a is from 31a/32 to 0 and the angle range of the commander knob 11 in which the modulus a is from 0 to a/32 are defined as the angle ranges for selecting the button disposed in the button area 1. With regard to each of the second to the sixteenth button areas 2 to 16, the angle ranges of the commander knob 11 in which the modulus a is from $(-a/32)+\{(i-1)a/16\}$ to $(-a/32)+(ia/16)$ are defined as angle ranges for selecting the button in the corresponding $i^{th}$ button area.

Figures 5A, 5B:
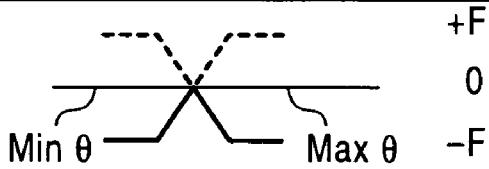
FIGS. 5A and 5B illustrate screen definition data and an object attribute table used in the data processing system of the embodiment of the present invention.

FIG. 5A illustrates an example of the screen definition data 212 which is generated by the data processing section 211.

In this example, an image A and disposition areas x, y-x, and y are indicated beside the term "image" in the first row. The image A is displayed as background on the display screen, and the areas x, y-x, and y are on the display screen for displaying the image A. Pieces of information regarding the buttons disposed on the display screen are indicated beside the terms "button" in the remaining rows.

More specifically, the pieces of information are indicated by the terms "type," "style," "label," and "value", and by x, y-x, and y beside each term "button." Each term "type" indicates the type of the corresponding button. Each term "style" indicates the display style, such as the color of display, of the corresponding button. Each term "label" indicates the text which is displayed on the corresponding button. Each term "value" indicates a message value (value which is recorded in the button information 224) which is sent to a data outputting section by the GUI controlling unit 22 when the operation of a corresponding button is determined. "x, y-x, and y" indicate the area where the corresponding button is displayed on the display screen. Here, in the embodiment, the types of buttons used are command buttons for accepting a request for executing an operation selected by the user, and item buttons for accepting the selection of an item by the user.

FIG. 5B shows an example of the object attribute table 215.

As shown in FIG. 5B, the object attribute table 215 previously defines force patterns of display elements on the display screen, such as buttons and a space. In the illustrated example, force patterns which are defined in accordance with the types of buttons and force patterns defined in terms of the space are recorded in the object attribute table 215.

In each force pattern shown in FIG. 5B, the horizontal axis represents the rotational angle, with direction towards the right corresponding to the clockwise direction; and the vertical axis represents a torque which is applied to the commander knob 11, with a positive torque representing a clockwise torque and a negative torque representing a counterclockwise torque. Minθ and Maxθ represent points on the force patterns corresponding to the lower limits and the upper limits measured clockwise in the angle ranges of the commander knob 11 corresponding to the buttons and space. Each of the force patterns represented by a solid line is used when the commander knob 11 is rotated clockwise, whereas each of the force patterns represented by a dotted line is used when the commander knob 11 is rotated counterclockwise.

According to each of the illustrated force patterns defined in terms of the buttons, when the commander knob 11 is rotated from an angle range boundary point corresponding to the button to a central angle within the angle range corresponding to the button, a force opposing the operation of the user is gradually reduced, and becomes zero at the central angle of the angle range corresponding to the button. Thereafter, when the commander knob 11 is further rotated from the central angle of the angle range corresponding to the button to outside the angle range corresponding to the button, the force opposing the operation of the user is gradually increased up to the boundary point of another angle range corresponding to the button. In other words, a force which produces a tactile sensation, like that which guides the operation of the user to the central angle of the button, acts upon the user. Such a guiding force is defined so that it is strong at a command button, and is weak at an item button.

According to the illustrated force patterns defined in terms of the space, when the commander knob 11 is rotated from an angle range boundary point corresponding to the space to a central angle of the angle range corresponding to the space, a force opposing the operation of the user is gradually increased, and becomes a maximum at the central angle of the angle range corresponding to the space. Thereafter, when the commander knob 11 is further rotated from the central angle of the angle range corresponding to the space to outside this angle range corresponding to the space, the force opposing the operation of the user is gradually reduced. In other words, a force acts upon the user so that the user feels the space as an obstacle.

These force patterns are set so that the torques which are applied at the boundary points (Minθ and Maxθ) to the operation of the user in the same direction of rotation are equal to each other.

The force pattern calculating section 214 calculates force patterns for the entire display screen as follows in accordance with the screen definition data 212 and the object attribute table 215, and records them in the force pattern table 234.

More specifically, as shown in FIG. 4C, the screen definition data 212 indicates that buttons are disposed in only 10 of the 16 button areas shown in FIG. 4A. Command buttons are disposed in the button areas 1, 2, 12, 13, and 16, and item buttons are disposed in the button areas 4, 5, 6, 7, and 8.

Figure 4E:
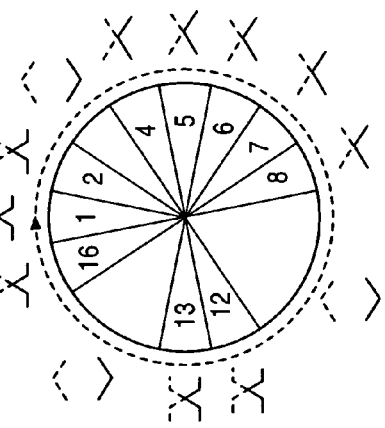

In this case, as shown in FIG. 4E, the force pattern calculating section 214 defines force patterns defined according to the button types given in the object attribute table 215 in terms of the angle ranges of the button areas where the buttons are disposed as a result of adjusting angle direction scales so that Minθ and Maxθ match the lower limits and the upper limits which are determined clockwise in the angle ranges of the corresponding buttons. In addition, the force pattern calculating section 214 defines force patterns defined by continuous portions (spaces where the buttons are not disposed) in the object attribute table 215 in terms of the angle ranges of the corresponding spaces as a result of adjusting angle direction scales so that Minθ and Maxθ match the lower limits and the upper limits which are determined clockwise in the angle ranges of the corresponding spaces.

Figure 4F:
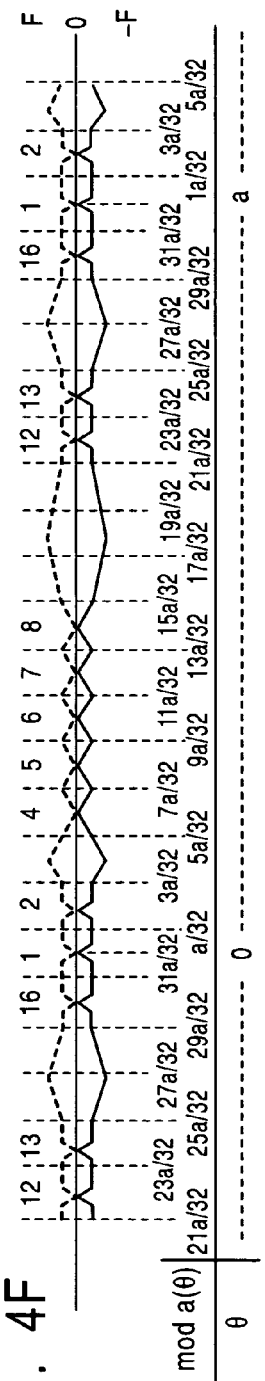

The force pattern calculating section 214 determines the relationships shown in FIG. 4F in terms of the torques of the commander knob 11 being functions of the rotational angles of the commander knob 11. The relationships are obtained as a result of defining the force patterns in the object attribute table 215 in terms of angle ranges. The force pattern calculating section 214 stores the determined relationships as calculated force patterns in the force pattern table 234. The horizontal axis in FIG. 4F represents clockwise rotational angle of the commander knob 11, with mod a(θ) representing the modulus a in terms of θ. The vertical axis in FIG. 4F represents torque, with a positive torque representing a clockwise torque and a negative torque representing a counterclockwise torque. Each of the force patterns represented by a solid line is used when the commander knob 11 is rotated clockwise, whereas each of the force patterns represented by a dotted line is used when the commander knob 11 is rotated counterclockwise.

The data processing section 211 may control the display screen shown in FIG. 4C, for example, as follows.

First, as shown in FIG. 4C, the data processing section 211 generates the screen definition data 212 which defines a display screen in which the button in the button area 1 is defined as a button selection color, and instructs the force pattern calculating section 214 and the screen output processing section 213 to be reset. If the data processing section 211 receives a message which indicates that the button selection is changed from the button disposed in the button area 1 to the button disposed in the button area 16 from the GUI controlling unit 22 in accordance with an operation of the user, the data processing section 211 generates the screen definition data 212 which defines the display screen in which the button in the button area 16 is defined as a button selection color, and instructs the screen output processing section 213 to be reset. Here, since the button layout on the display screen is not changed, that is, since the button display color is only changed, it is not necessary to instruct the force pattern calculating section 214 to be reset. When any of the buttons is selected, if a message is given in accordance with a determined operation of the button, an operation is carried out in accordance with the given message. If necessary, the data processing section 211 generates the screen definition data 212 which defines a new display screen, and instructs the force pattern calculating section 214 and the screen output processing section 213 to be reset.

An embodiment of the present invention has been described above.

Although the content of the object attribute table 215 is described as being fixed, the data processing section 211 may be such as to update the content of the object attribute table 215 in accordance with the display screen used. The relationships between the button areas and the commander knob 11 shown in FIG. 4B can be changed as required by the data processing section 211 in accordance with the display screen used.

Although, in the object attribute table 215, the force patterns are defined in terms of display elements, the force patterns may be defined in terms of combinations of continuously disposed display elements, or as functions of the sizes of angle ranges of the display elements or combinations of the display elements.

Although, in the foregoing description, when the data processing device 2 is constructed as a system comprising an operating system, the force patterns (stored in the force pattern table 234) are calculated and established for the display screen by an application program, the force patterns may be calculated and established for the display screen by the operating system.

In the foregoing description, the tactile sensation applied to the user is controlled by torque generated by the actuator 15. However, the method of the embodiment of calculating patterns which apply a tactile sensation to the user in accordance with types of display elements, such as buttons and spaces on the display screen, and in accordance with the disposition of the display elements, and of defining the patterns by the operation of the input device by the user may be similarly applied to the case in which a tactile sensation is applied to the user in terms of other types of forces, such as vibration or frictional force.

Figure 6A:
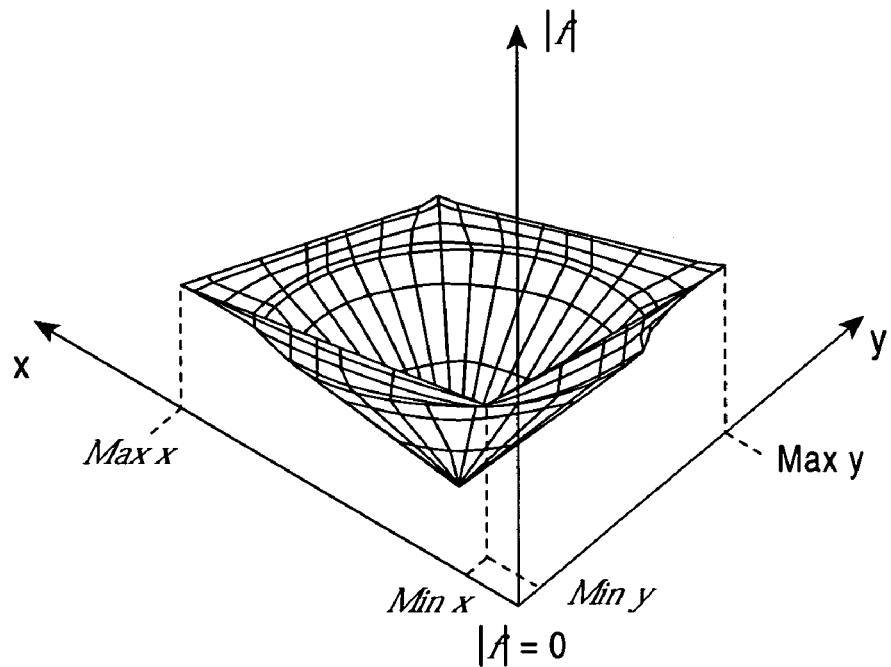
FIGS. 6A and 6B illustrate other examples of force patterns which are set at display elements in the embodiment of the present invention.
Figure 6B:
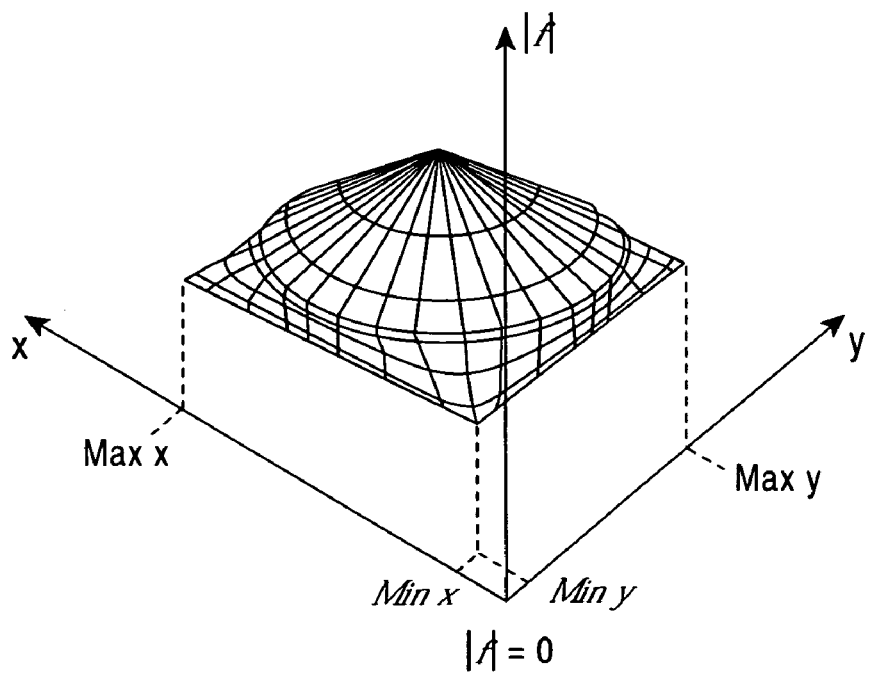

Although, in the above-described embodiment, the input device is described as being the haptic commander 1 which accepts only a uniaxial (axis of rotational angle θ) input as a spatial operation on the display screen by a rotational operation by the user, the embodiment may similarly be applied to an input device which accepts an XY biaxial input on the display screen, performed by, for example, a trackball, a mouse, or a joystick. More specifically, in this case, force patterns shown in FIGS. 6A and 6B are defined in the object attribute table 215. By allocating the force patterns shown in FIGS. 6A and 6B to a button display area and an empty display area (space) based upon the object attribute table 215 and the screen definition data 212, the relationship between the coordinates on the display screen and the torque applied to the user is determined and stored in the force pattern table 234. The torque in accordance with the coordinates to which the user is pointing to with an input device (that is, the coordinates of a displayed cursor when the cursor is moved by the user) is generated based upon the force pattern table 234. FIG. 6A shows the force pattern with regard to a button, and FIG. 6B shows the force pattern with regard to the space. FIGS. 6A and 6B show the absolute values of the torques, and the torques are in a direction opposite to the direction of rotational operation by the user.

In the embodiment, even if a display screen having a layout which is not previously fixed is used, when the display screen starts a displaying operation, it is possible to set a tactile sensation to be applied to the user based upon an input from the input device so that the tactile sensation matches the contents on the display screen, after which the tactile sensation is applied to the user based upon the input from the input device in accordance with the setting. Therefore, it is possible to properly control the tactile sensation which is applied to the user by the operation of the input device by the user on any display screen.

What is claimed is:

1. A data processing system comprising:
a display device for displaying display screen elements within a variable screen layout;
an input device for applying a variable tactile sensation to a user; and
a processing device for generating display screen data comprising data for each of the display screen elements within the variable screen layout and sending the display screen data to the display device;
wherein the processing device dynamically generates a tactile sensation control pattern that defines a force pattern associated with all of the display screen elements within the variable screen layout as a function off (1) a data structure that defines different tactile sensation force patterns for each display screen element within the variable screen layout based upon respective types of display elements and (2) an arrangement of the display elements within the variable screen layout, at the time that the display screen data is sent to the display device, and stores the dynamically generated tactile sensation control pattern so that subsequently the tactile sensation applied to the user via the input device while the display elements are being displayed on the display screen is calculated by the processing device in accordance with the dynamically generated tactile sensation control pattern.

2. A data processing system according to claim 1, wherein the different tactile sensation patterns indicate the relationship between input data generated by the input device and the tactile sensation for each display element.

3. A data processing system according to claim 2, wherein the display elements that each have a different tactile sensation pattern stored by type in the data structure comprise (1) display objects for accepting an operation selected by the user and (2) a space between the display objects, the space being a portion on the display screen where the display objects are not present.

4. A data processing system according to claim 2, wherein the input device comprises an operation unit rotatable by the user and an actuator for applying a force to the operation unit corresponding to the direction of rotation of the operation unit,
the dynamically generated tactile sensation control pattern indicates a relationship between the rotational angle of the operation unit and the force applied to the operation unit, and
the processing device controls the force applied by the actuator in accordance with the dynamically generated tactile sensation control pattern.

5. A data processing system according to claim 2, wherein the tactile sensation applied to the user is based upon the input data from the input device which indicates the positions of the display elements within a display range.

6. A data processing system according to claim 5, wherein the input device is a pointing device for inputting coordinates on the display screen.

7. A data processing system according to claim 5, wherein the input device is a haptic commander.

8. A method for applying a variable tactile sensation to a user through an input device, the method comprising:
dynamically generating variable screen definition data comprising data for display elements to be displayed within a screen layout on a display device, the screen layout of the display elements being variable;
sending the variable screen definition data to the display device;
dynamically generating a new tactile sensation control pattern when the variable screen definition data is sent to the display device, the new tactile sensation control pattern being calculated as a function of (1) the variable screen definition data that defines all of the individual display elements to be displayed within the screen layout, and (2) an object attribute table that defines different tactile sensation force patterns for each display element in the screen layout based upon respective types of display elements, the new tactile sensation control pattern representing a relationship between input data to be received from the input device and the tactile sensation in accordance with an arrangement of all of the display elements to be displayed within the screen layout on a display screen of the display device;
resetting a tactile sensation control pattern, that controls tactile sensation to be applied, to the new tactile sensation control pattern dynamically generated; and
subsequently controlling the tactile sensation associated with each of the display elements displayed based upon the input data from the input device in accordance with the new tactile sensation control pattern, whereby a variable tactile sensation is applied to the user through the input device.

9. A method for applying a variable tactile sensation to the user through an input device according to claim 8, wherein the different tactile sensation force patterns (1) indicate the relationship between the input data and the tactile sensation for individual display elements and (2) are previously determined according to the types of the display elements.

10. A method for applying a variable tactile sensation to the user through an input device according to claim 9, wherein the display elements having different tactile sensation force patterns comprise (1) display objects for accepting an operation selected by the user and (2) a space between the display objects, the space being a portion in the display screen where the display objects are not present.

11. A method for applying a variable tactile sensation to the user through an input device according to claim 9, wherein the input device comprises an operation unit rotatable by the user and an actuator for applying a force to the operation unit corresponding to the direction of rotation of the operation unit, and the new tactile sensation control pattern indicates a relationship between the rotational angle of the operation unit and the force applied by the actuator.

12. A method for applying a variable tactile sensation to the user through an input device according to claim 9, wherein the tactile sensation applied to the user is based upon the input data from the input device which indicates positions of the display elements within a display range.

13. A computer program stored on a storage medium which is read and executed by a computer system comprising a display device and an input device for applying a variable tactile sensation to a user, the computer program directs the computer system to
    dynamically generate display screen data comprising data for display elements to be displayed, an arrangement of the display elements within a variable screen layout being variable;
    send the dynamically generated display screen data to the display device;
    dynamically calculate a relationship between input data to be received from the input device and the tactile sensation, at the time that the dynamically generated display screen data is sent to the display device, in accordance with (1) the dynamically generated display screen data defining the variable arrangement of the display elements within the variable screen layout and (2) object attribute data defining different tactile sensation force patterns for each display element within the variable screen layout based upon respective types of display elements; and
    reset a tactile sensation control pattern that controls a tactile sensation to be applied via the input device to the dynamically calculated relationship during runtime, so that the tactile sensation subsequently applied to the user when the display elements are displayed on a display screen is based upon the input data received from the input device in accordance with the dynamically calculated relationship.

14. A computer program according to claim 13, wherein the computer system (1) dynamically connects the different tactile sensation force patterns in accordance with the variable arrangement of the display elements to be displayed on the display screen at the time that the display screen data is sent to the display device, and (2) stores the dynamically connected different tactile sensation force patterns as the tactile sensation control pattern.

15. A computer program according to claim 14, wherein the display elements that have associated different tactile sensation force patterns comprise (1) display objects for accepting an operation selected by the user and (2) a space between the display objects, the space being a portion on the display screen where the display objects are not present.

16. A computer program according to claim 14, wherein the input device comprises an operation unit rotatable by the user and an actuator for applying a force to the operation unit corresponding to the direction of rotation of the operation unit,
    the computer system dynamically stores the tactile sensation control pattern as a pattern which indicates a relationship between the rotational angle of the operation unit and the force applied to the operation unit and controls the force applied by the actuator in accordance with the tactile sensation control pattern.

17. A computer program according to claim 14, wherein the tactile sensation applied to the user is based upon the input data from the input device which indicates the positions of the display elements within a display range.

18. A computer program according to claim 17, wherein the input device is a pointing device for inputting coordinates on the display screen.

19. A storage medium which stores a computer program which is read and executed by a computer system comprising a display device and an input device for applying a variable tactile sensation to a user, wherein the computer program directs the computer system to
    dynamically generate screen definition data comprising data for display elements, an arrangement of the display elements being variable;
    send the dynamically generated screen definition data to the display device;
    dynamically calculate a relationship between input data to be received from the input device and the tactile sensation, at the time that the dynamically generated screen definition data is sent to the display device, in accordance with (1) the dynamically generated screen definition data defining the variable arrangement of all of the display elements and (2) object attribute data defining different tactile sensation force patterns for each display element within the dynamically generated screen definition data based upon respective types of display elements;
    dynamically reset a tactile sensation control pattern to the dynamically calculated relationship; and
    subsequently control the tactile sensation associated with each display element displayed on a display screen based upon the input data received from the input device in accordance with the dynamically reset tactile sensation control pattern.

20. A storage medium according to claim 19, wherein the computer system (1) dynamically connects individual tactile sensation patterns, each individual tactile sensation pattern being associated with a display element, in accordance with the variable arrangement of the display elements to be displayed on the display screen at the time that the display screen data is sent to the display device, and (2) stores the dynamically connected individual tactile sensation patterns as the dynamically reset tactile sensation control pattern, the individual tactile sensation patterns indicate the relationship between the input data and the tactile sensation.

* * * * *